Sept. 30, 1969　　　D. R. SCHULTZ　　　3,469,677
YIELDING MOUNT FOR SEPARATOR CONVEYOR ON LEGUME HARVESTER
Filed April 27, 1967　　　　　　　　　　2 Sheets-Sheet 1
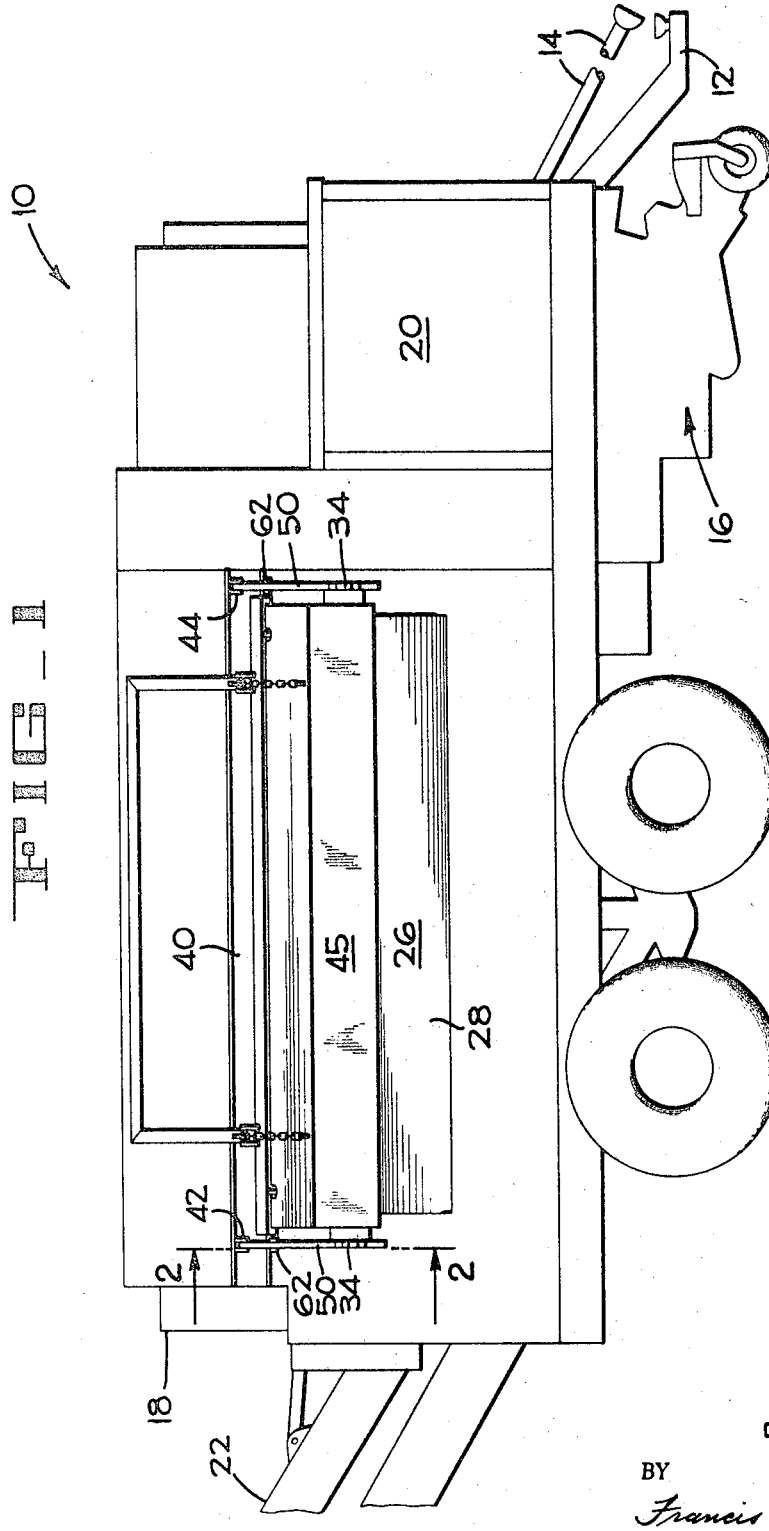
INVENTOR.
DENNIS R. SCHULTZ
BY
Francis W. Anderson
ATTORNEY Sept. 30, 1969          D. R. SCHULTZ          3,469,677
YIELDING MOUNT FOR SEPARATOR CONVEYOR ON LEGUME HARVESTER
Filed April 27, 1967          2 Sheets-Sheet 2
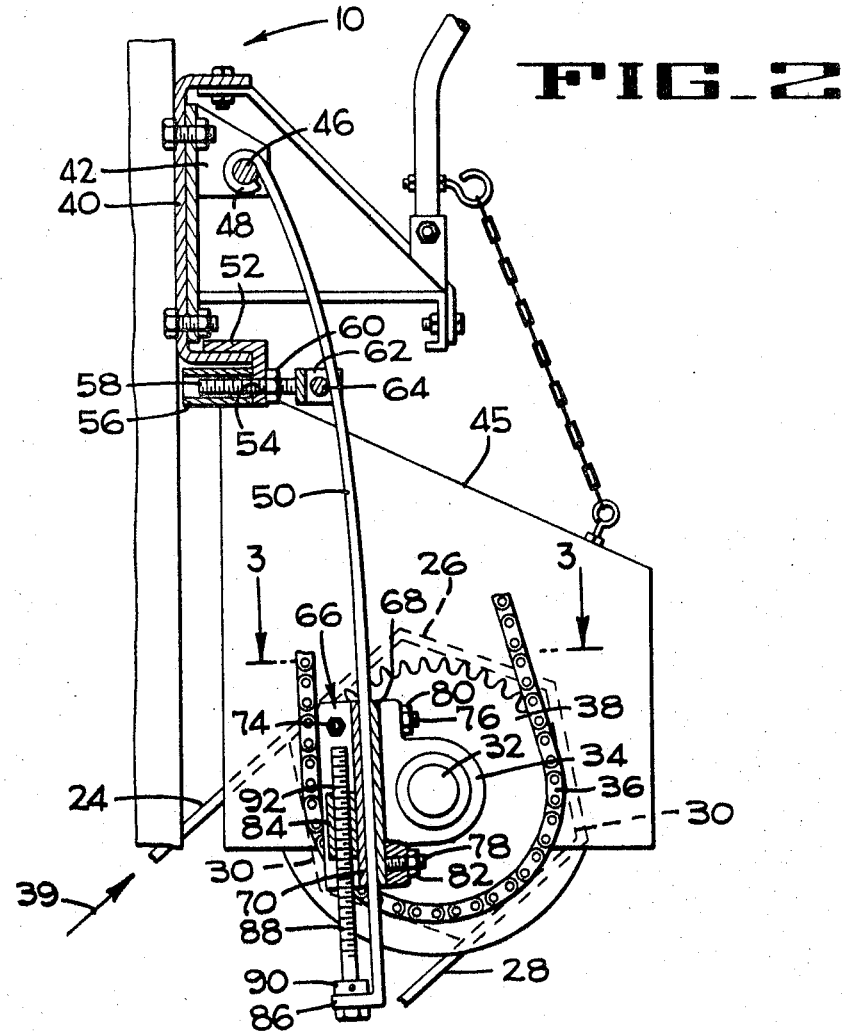
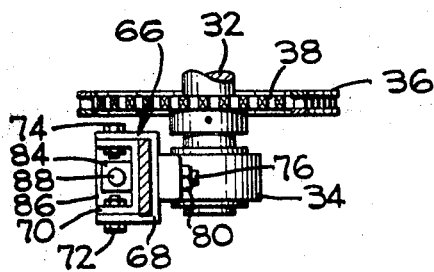
INVENTOR.
DENNIS R. SCHULTZ
BY
*Francis W. Anderson*
ATTORNEY United States Patent Office 3,469,677
Patented Sept. 30, 1969

3,469,677
YIELDING MOUNT FOR SEPARATOR CONVEYOR ON LEGUME HARVESTER
Dennis R. Schultz, Rossville, Ill., assignor to FMC Corporation, San Jose, Calif., a corporation of Delaware
Filed Apr. 27, 1967, Ser. No. 634,143
Int. Cl. B65g 15/30
U.S. Cl. 198—208                                    4 Claims

ABSTRACT OF THE DISCLOSURE

A mount for one end of an inclined separator conveyor of a portable legume harvester is disclosed as being adjustable for setting the inclination of the separator within a desired range and includes a resilient member which automatically adjusts the belt tension throughout the range of position adjustment.

BACKGROUND OF THE INVENTION

Field of the invention.—The present invention is directed to apparatus for use in portable harvesters for leguminous vegetable crops such as peas, beans and the like, and more particularly directed to a separator conveyor mount which is adjustable to vary the slope of the conveyor and will yield to excessive belt pull.

Description of the prior art.—Harvesting machines of the type to which this invention pertains are disclosed in my pending patent applications, Ser. Nos. 564,129 and 590,899, now Patent No. 3,415,371. In such harvesters, the crop is removed from the ground and elevated into one end of a thrashing machine formed by a rotatable screen drum with beaters therein which intermittently apply blows to the crop and thus burst the pods. The peas pass outwardly through apertures in the screen to conveying means, including an endless separator apron or belt, occasionally referred to in the art as a draper or cleaning apron. The draper is trained about a pair of parallel elongated drums and has an upper run inclined suitably for the relatively round peas to roll downwardly under the influence of gravity, while the extraneous material passes upwardly and out of the harvester.

The upper elongated drum should be adjustably mounted to vary the slope of the draper to a suitable angle for the particular crop being harvested. The draper is made of canvas with an effective coefficient of friction to carry extraneous material while permitting peas and the like to roll. Before harvesting operations, the drum is set to maintain the draper belt at a suitable slope and in operation, the belt tends to become wet due to moisture on the vines. This causes the canvas to shrink upon drying and unless belt tension is relieved, the draper will break. In the pea harvester shown in my pending patent application, Ser. No. 590,899, now Patent No. 3,415,371, resilient means were provided to enable the drum mount to yield upon excessive belt tension but some adjustments in position of the drum would completely take up all the resiliency of the resilient means and render it ineffective to compensate for further shrinking of the belt during drying thereof.

SUMMARY OF THE INVENTION

An object of the present invention is to provide a mount for the upper drum of an endless belt separator conveyor which will yield to excessive belt pull throughout the entire range of position adjustment of the belt to maintain the belt within safe limits of tension. This object is achieved by use of a resilient member supporting the drum in a manner to minimize the affect of adjustments in drum position upon the yieldability of the resilient member. A metal strip of the type used to form a leaf spring is positioned vertically with the drum adjustably secured thereto near one end, this end being free to deflect, as an overhang portion of a cantilever beam, from the vertical.

BRIEF DESCRIPTION OF THE DRAWINGS

FIGURE 1 is a diagrammatic side view of a portable legume harvester in which the present invention is embodied.

FIGURE 2 is an enlarged section taken along line 2—2 of FIG. 1 and particularly showing the spring mount of the present invention.

FIGURE 3 is a fragmentary section taken generally along line 3—3 of FIG. 2.

DESCRIPTION OF THE PREFERRED EMBODIMENT

Referring to FIG. 1, a general understanding may be obtained of the type of equipment utilizing the present invention. A portable harvester 10 is shown having a hitch 12 whereby a tractor, not shown, may be coupled, and a power takeoff 14 is provided for linking the tractor to drive a vine-pickup mechanism, generally indicated by the reference character 16. This pickup mechanism takes crops from the ground and passes them upward and rearwardly to a point where they are elevated into the open front end of a rotary screen drum, the rear end of which is indicated by 18. The harvester is powered by an engine 20 with suitable drive means for driving all parts of the equipment.

The crop passes cyclically around within the drum 18 and is subjected to both a beating and tumbling action while being moved rearwardly in the machine. The pods of leguminous crops, such as peas or beans, are burst open by this beating action and the peas pass through apertures in the screen drum. Coarse debris and extraneous material such as weeds, stems, leaves and the like pass rearwardly of the harvester and are delivered onto the conveying surface of an inclined elevator indicated at 22. Fine extraneous material, along with the peas, pass through the apertures in the screen drum and drop downward upon the upper run of a conveyer belt, not shown, which carries the same to the upper run 24 (FIG. 2) of a laterally-directed endless movable draper or conveyor belt 26, having a lower run 28. The runs 24 and 28 are trained over a hexagonal drum, shown in dotted lines and indicated by reference numeral 30, that is mounted on a shaft 32 which is journalled at each end in a bearing block 34. The lower end of draper or conveyor belt 26 is trained about a similar hexagonal drum, not shown, and the belt is driven by drive chain 36 trained about sprocket 38 on shaft 32. The drive chain is driven by drive means, not shown, connected to the engine 20 as by the mechanism disclosed in my prior application Ser. No. 564,129.

Separation of the edible crop from fine extraneous material is achieved by moving them together on upper run 24 in an upwardly direction as indicated by arrow 39. Since peas and beans are of a generally spherical or rounded shape, they tend to roll downward under the influence or gravity and drop upon a conveyor, not shown, positioned below. From this point, the crop is conveyed to a storage hopper, also not shown, by operations more fully described in my prior patent application, Ser. No. 590,899, now Patent No. 3,415,371. The fine extraneous material is more irregularly shaped then the crop and tends to cling and be carried by belt friction upwardly and out of the harvesting equipment. Since crops will vary as to their tendencies to roll under the influence of gravity, it is desirable to mount belt 26 in a manner enabling adjustment of the slope to accommodate the crop. A suitable inclination is usually found within the range between thirty and thirty-five degrees to the horizontal. The belt is preferably made of canvas which has an effective coefficient of friction with extraneous material but allows the peas to roll readily thereon. However, canvas also has a tendency to shrink when drying after becoming wet during operation of the harvester; this presents a special problem to which the present invention is directed.

A channel member 40 extends longitudinally of the harvester 10, as shown in FIG. 1, and a pair of clevises 42 and 44 is fixed to opposite ends thereof for supporting the hexagonal drum 30 (see FIG. 2) beneath a hood 45. The mounting means depending from each clevis are similar to each other and therefore, only the one depending from clevis 42 will be described in detail. This clevis is bolted to the channel web and supports a pin 46, as shown in FIG. 2. An eye 48 is provided at one end of a resilient member 50 which is pivotally positioned upon the pin of the clevis for holding the resilient member in place. This resilient member is fashioned from a metal strip of the type used to form a leaf spring and pivotably depends from the clevis pin in a generally vertical direction.

Intermediate support for the resilient member 50 is provided by an angle 52, attached as by welding to the lower flange of the channel member 40 and having a hole 54 drilled in the depending leg. Sleeve 56 is fixed to the angle in alignment with the hole in the depending leg for receiving a bolt 58. An adjusting nut 60 is provided on the bolt for limiting penetration thereof within the hole and sleeve. In this manner, the position of the outstanding bolt end can be precisely set and adjusted. A yoke 62 is mounted at the outstanding end of the bolt for supporting a rod 64 which in turn contacts the resilient member at an intermediate point spaced below the eye 48. This intermediate support limits inward pivoting of the resilient member on pin 46 but the overhanging portion of the resilient member extending below the rod can deflect from a normal position in cantilever fashion.

A slide 66 is fitted about the lower portion of the resilient member which overhangs horizontal support rod 64 and includes an outer channel member 68 (FIG. 3) and an inner channel member 70. The other channel member is positioned with the inner web surface contacting the outer surface of the resilient member 50 and the legs extend thereabout, as shown in FIG. 3. The inner channel slips between the legs of the outer channel so that the outer web surface contacts the inner surface of the resilient member, and the legs of each channel are bolted together by bolts 72 and 74. Thus, the slide is locked about the resilient member but it is free to move vertically thereon. A pair of anchor bolts 76 and 78 project from the web of the outer channel for mounting bearing block 34, and nuts 80 and 82 secure the block in place thereon. A threaded sleeve 84 is fixed to the inner web surface of the inner channel member and is positioned directly above a perpendicular end portion 86 of the resilient member. A bolt 88 fits freely through a hole in the end portion and is locked therein by a collar 90. The bolt has a threaded stud portion 92 which extends through the threaded sleeve on the slide 66 so that rotation of the bolt causes the slide to travel up or down on the resilient member.

The bearing blocks 34 at each end of shaft 32 are moved to position the upper run 24 of draper belt 26 at a desired slope by making the following horizontal and vertical adjustments to each bearing block. Adjusting nut 60 is rotated so that bolt 58 moves inward or outwardly of sleeve 56 permitting the lower end of member 50 to move inwardly or outwardly of the harvester. By rotating the head of bolt 88, the threaded stud portion 92 travels within the threaded sleeve 84 and causes slide 66 to move up and down the resilient member. These horizontal and vertical adjustments are made until the bearing block is positioned to provide the proper slope for the hopper run of the draper belt. In the event of an increase in belt tension due to shrinkage of the draper belt, resilient member 50 is free to bend in cantilever fashion from the support rod 64 allowing the bearing block to move inward toward the harvester 10. This yielding of the resilient member maintains belt tension within safe limits. Horizontal positioning of the resilient member by bolts 58 has very little effect upon the yieldability of the resilient member. This is due to the fact that the resilient member extends downward in a vertical direction a considerable distance below the cross rod 64 and is free to deflect horizontally in cantilever fashion. The vertical position of the slide does not have a great amount of influence upon the yieldability of the resilient member because at the uppermost limit of slide travel, the cross rod 64 is still substantially spaced from the slide providing a substantial length of cantilever arm.

Having thus described my invention, what I claim as new and desire to protect by Letters Patent is:

1. In a harvester for vine crops, such as peas and the like, a continuous belt conveyor having an inclined upper run movable upwardly and outwardly of the harvester, a rotatable member supporting the upper end of the belt, and means for adjustably mounting said rotatable member within a range of horizontal and vertical positions to set the upper run of said belt at a desired slope; the improvement wherein said mounting means includes a resilient member at each end of said rotatable member and pivotably connected at one end to the harvester, means for intermediately supporting said resilient member from the harvester, said resilient member including an overhang portion extending a substantial distance from the intermediate support to the point where said rotatable member is mounted, said resilient member being resiliently yieldable to belt pull in excess of safe limits of belt tension within the entire range of position adjustment.

2. An apparatus according to claim 1, wherein said intermediate support means for each resilient member is adjustable to position the rotatable member within a range of horizontal positions.

3. An apparatus according to claim 1, including a bearing block slidably mounted on each resilient member for mounting the rotatable member.

4. An apparatus according to claim 3, wherein the bearing block includes a threaded sleeve and said resilient member has an end portion projecting from the overhang portion, and a bolt extends upward through the end portion to engage said bearing block for adjustably positioning the rotatable member within a vertical range of adjusted positions.

References Cited
UNITED STATES PATENTS 2,480,294    8/1949    Hume _____ 198—208
2,696,123    12/1954    Swan _____ 74—242.11

M. HENSON WOOD, Jr., Primary Examiner

R. A. SCHACHER, Assistant Examiner

U.S. Cl. X.R.

74—242.14; 209—114